(12) United States Patent  
Tout et al.

(10) Patent No.: US 8,636,140 B2  
(45) Date of Patent: Jan. 28, 2014

(54) CHAIN TENSION SENSOR

(75) Inventors: John Tout, Worchester (GB); Gordon Powell, Malvern (GB); Robert Smith, Malvern (GB)

(73) Assignee: Joy MM Delaware, Inc., Wilmington, DE (US)

( * ) Notice: Subject to any disclaimer, the term of this patent is extended or adjusted under 35 U.S.C. 154(b) by 0 days.

(21) Appl. No.: 13/553,487

(22) Filed: Jul. 19, 2012

(65) Prior Publication Data

US 2013/0015043 A1    Jan. 17, 2013

Related U.S. Application Data

(63) Continuation-in-part of application No. 13/297,067, filed on Nov. 15, 2011, which is a continuation-in-part of application No. 12/767,411, filed on Apr. 26, 2010, now Pat. No. 8,061,510.

(60) Provisional application No. 61/510,839, filed on Jul. 22, 2011.

(51) Int. Cl.  
*B65G 23/44* (2006.01)

(52) U.S. Cl.  
USPC .......................................................... 198/814

(58) Field of Classification Search  
USPC .............................................. 198/810.04, 813  
See application file for complete search history.

(56) References Cited

U.S. PATENT DOCUMENTS

| | | | |
|---|---|---|---|
| 3,181,691 A * | 5/1965 | Kagley | ........................... 198/813 |
| 3,675,482 A | 7/1972 | Hewitt | |
| 3,718,250 A | 2/1973 | Bosworth et al. | |
| 3,911,764 A | 10/1975 | Duggan | |
| 3,926,304 A | 12/1975 | Watabe | |
| 3,963,115 A | 6/1976 | Teske et al. | |
| 4,372,172 A | 2/1983 | Gombócz et al. | |
| 4,533,856 A | 8/1985 | Malone | |

(Continued)

FOREIGN PATENT DOCUMENTS

| | | |
|---|---|---|
| CN | 1576194 | 2/2005 |
| CN | 2703258 | 6/2005 |

(Continued)

OTHER PUBLICATIONS

United Kingdom Intellectual Property Office Search Report for Application No. GB0907258.8 dated Apr. 8, 2010, 2 pages.

(Continued)

*Primary Examiner* — James R Bidwell

(74) *Attorney, Agent, or Firm* — Michael Best & Friedrich LLP

(57) ABSTRACT

A chain tension sensor for a chain conveyor, the conveyor including a frame and a chain having a plurality of flights. The tension sensor includes a reaction arm and a load sensing pin. The reaction arm includes a first end, a second end opposite the first end, and a load pad. The first end is pivotably coupled to the frame by a pivot pin defining a pivot axis. The load pad is adjacent the conveyor chain and positioned to contact flights passing the load pad. The flights contacting the load pad exert a force on the reaction in a direction that is perpendicular to the pivot axis. The load sensing pin is coupled to the reaction arm such that the load sensing pin senses the force that is exerted by the flights.

20 Claims, 17 Drawing Sheets

(56) References Cited

U.S. PATENT DOCUMENTS

| | | |
|---|---|---|
| 4,657,131 A | 4/1987 | Brychta et al. |
| 5,119,893 A | 6/1992 | Jost |
| 5,131,528 A | 7/1992 | Bandy, Jr. |
| 5,482,154 A | 1/1996 | Affeldt et al. |
| 5,505,293 A | 4/1996 | Ochs et al. |
| 5,624,162 A | 4/1997 | Guse et al. |
| 5,632,372 A | 5/1997 | Steinbuchel, IV et al. |
| 5,641,058 A | 6/1997 | Merten et al. |
| 5,647,640 A | 7/1997 | Heintzmann et al. |
| 5,736,652 A | 4/1998 | Strubbe |
| 5,895,332 A | 4/1999 | Olson et al. |
| 5,997,423 A | 12/1999 | Kwon |
| 6,131,727 A | 10/2000 | Nelson |
| 6,545,231 B1 | 4/2003 | Häfner |
| 6,715,601 B2 | 4/2004 | Abel et al. |
| 6,925,890 B2 | 8/2005 | Fontenot |
| 7,117,989 B2 | 10/2006 | Weigel et al. |
| 7,540,374 B2 | 6/2009 | Rathbun et al. |
| 7,600,822 B2 | 10/2009 | Klabisch et al. |
| 7,793,775 B2 | 9/2010 | Rozenfeld et al. |
| 8,061,510 B2 * | 11/2011 | Tout .................... 198/810.04 |
| 2010/0031981 A1 * | 2/2010 | Gaus et al. .................... 198/814 |
| 2010/0270128 A1 | 10/2010 | Hill |
| 2010/0270130 A1 | 10/2010 | Tout |
| 2010/0270131 A1 | 10/2010 | Vasey |
| 2011/0024268 A1 | 2/2011 | Merten et al. |

FOREIGN PATENT DOCUMENTS

| | | |
|---|---|---|
| CN | 1661346 | 8/2005 |
| CN | 101948045 | 1/2011 |
| DE | 2017949 | 10/1971 |
| EP | 1310700 | 5/2003 |
| GB | 2095721 | 10/1982 |
| GB | 2346663 | 8/2000 |
| WO | 2010/028783 | 3/2010 |

OTHER PUBLICATIONS

Chinese First Office Action for Application No. 201010167738.9 dated Sep. 3, 2013 (6 pages, English translation only).

* cited by examiner

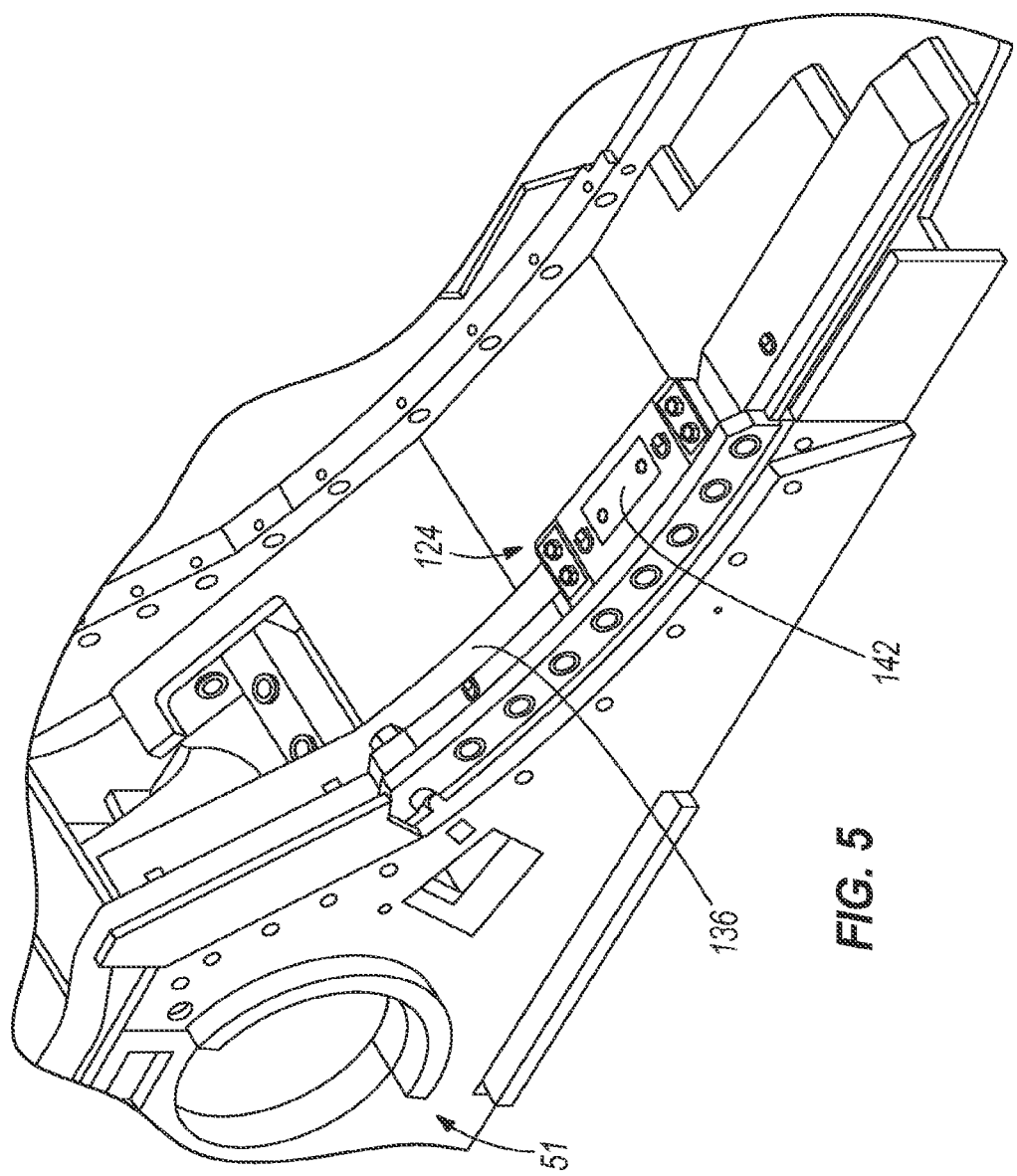

CHAIN TENSION SENSOR

RELATED APPLICATIONS

This application is a continuation-in-part of prior-filed, U.S. application Ser. No. 13/297,067, filed Nov. 15, 2011, which is a continuation-in-part of prior-filed U.S. application Ser. No. 12/767,411, filed Apr. 26, 2010, now U.S. Pat. No. 8,061,510, issued Nov. 22, 2011, and also claims the benefit of prior-filed, U.S. Provisional Application No. 61/510,839, filed Jul. 22, 2011, the entire contents of all of which are hereby incorporated by reference.

FIELD

The present invention generally relates to mining equipment, and, in particular, to drive chain conveyors. Still more particularly, this application relates to a mechanism to sense the tension of a scraper chain of a chain conveyor.

BACKGROUND

Conveyors, such as armored face conveyors, are part of an integrated longwall system that also comprises a coal-cutting machine and roof supports. As the longwall system removes mineral from the mineral block one strip (web) at a time, the load on the conveyor changes as the cutter moves along the conveyor. The conveyor progressively moves forward one web in order to reposition itself for the next cut.

The mineral being mined is dragged along a top race of the conveyor by a continuous chain and flight bar assembly driven by sprockets at each end of the conveyor. More particularly, the conveyor typically includes a pair of spaced apart chains with the flight bars connecting the chains. At the delivery end, the mineral is discharged onto an adjacent conveyor while the continuous chain enters a bottom race where it proceeds to a return end, where a return end drum or sprocket reverses the direction of the chain.

Conventional longwall conveyors typically either operate at a fixed overall length or may be fitted with a moveable end frame. The amount of slack in the chain is controlled by applying a pre-tension to the chain. The pre-tension prevents chain extension, reducing the amount of slack generated.

An extendable end frame may be used to adjust the pre-tension by taking up increasing length of chain generated from inter-link wear and from stretching in the chain that occurs due to the load on the chain. The tension can be controlled by monitoring the amount of tension in the chain and adjusting the moveable end frame position with a feedback loop system.

The operation of the longwall system involves frequent repositioning of the many parts that make up the conveying system. Keeping the equipment inline with the coal block is difficult, as no direct steering mechanism is available with these systems. The operators have to rely on their experience by adjusting the position of the conveyor relative to the coal block to counteract a tendency of the equipment to gradually creep sideways. This results in face creep, and often the only corrective action available to the operators is to angle the conveyor a few degrees off square to the coal block. This process is slow and requires considerable skill. The variations in load and the repositioning of the many parts of the conveying system result in changes in chain tensions.

In certain operational situations, one of the chains of the chain and flight bar assembly may break on the top race. The unbroken chain can then enter the return race along with the broken chain. Lower tensions in the bottom race can be contained by the single chain, which continues to the return end and then over the return end sprocket. If the broken chain is not identified on the top race, the second chain will also fail, most likely when the broken portion of the chain approaches a discharge area. This additional failure can cause damage to related equipment. The failure is followed by prolonged down time to make a repair. Visual identification of the broken chain is possible, but is unlikely because the chain is covered with the mineral being conveyed. Additionally, on most installations, safety requirements prohibit operators from being adjacent the return end of the conveyor, which further reduces the opportunity for manual detection.

FIG. 1, which is taken from Bandy, U.S. Pat. No. 5,131,528, illustrates a prior art scraper chain conveyor. FIG. 1 illustrates in simple form the various conveyor elements necessary for understanding of the conveyor equipment environment. The conveyor apparatus or assembly is shown generally by the character numeral 10 and includes a drive drum/sprocket 12 and an idler or guide drum/sprocket 14 separated by a span of a flexible conveyor 16, illustrated partially in dashed line outline. As depicted, the conveyor 16 comprises dual conveyor chains 18 and a multiplicity of spaced flight bars 20 attached to the dual chains 18. During operation of the conveyor assembly, the flight bars 20 push aggregate material, such as mined coal, along an underlying conveyor pan 21. The conveyor assembly 10 is typically positioned juxtaposed to a mine wall where a seam of material is being mined for transporting the material to one end. The material is then transferred to an auxiliary conveyor for further disposition.

The drum/sprocket 12 is appropriately coupled to a conveyor drive motor 22. Operation of motor 22 causes the sprocket intermeshing with the dual chains 18 to advance the conveyor 16. A pair of sidewalls 24 forming a first portion of a "split frame" of conveyor assembly 10 serves to rotatably support the drum/sprocket 12. The sidewalls 24 are illustrated as being telescopingly engaged with a second pair of sidewalls 26 forming a second portion of the frame and, collectively with sidewalls 24, comprise the aforementioned split frame. The telescoping joint, indicated generally by character numeral 48, permits the frame portions to be moved relative to one another.

The idler drum/sprocket 14 is appropriately mounted for rotary movement between sidewalls 26. Relative movement at the joint 48 between the adjacent sidewalls 24 and 26 causes the distance between the drum/sprockets 12 and 14 to vary accordingly. The dual conveyor chains 18 can be provided with increased or reduced tension depending upon the direction of adjusting movement of the supporting drum/sprockets with respect to each other. To provide this relative movement, assembly 10 has a tensioning means in the form of a pair of hydraulic cylinders 28, 30. Each cylinder 28, 30 is mounted on and secured to an adjacent sidewall 26. In other embodiments (not shown), only a single hydraulic cylinder can be used. The cylinders 28, 30 include respective pistons 32, 34, each of which is operatively coupled to a sidewall 24 in any known and expedient manner.

Movement of the pistons 32, 34 causes the first portion of the conveyor 16 represented by the side walls 24 to move longitudinally relative to the second portion and side walls 26, thus relaxing or tensioning the chain 18, as desired. Control of movement of pistons 32 and 34 is affected by a conventional hydraulic tensioning control circuitry, depicted generally by numeral 40 in FIG. 1.

As stated above, a certain amount of tensioning of conveyor chain 18 is essential for the proper and efficient operation of the conveyor assembly 10. Too little tension may cause the conveyor chain to ride up the teeth of the sprockets, and eventually become disengaged. Conversely, too much tension may cause the conveyor components to be over-stressed, increasing the risk of mechanical failure in the various parts of the conveyor apparatus.

FIG. 2, which is taken from Weigel et al., U.S. Pat. No. 7,117,989, illustrates a prior art mechanism for controlling the tension in a scraper chain in a conveyor. FIG. 2 shows a tensionable return station 51, which forms the auxiliary drive of a face conveyor and on which a spoked chain wheel 52 is located, which may be powered by drives (not shown).

All channel sections 70 and machine frame 51 and, where applicable, any intermediate or transitional channels located between them, have a top race 54A and a bottom race 54B. In the top race 54A the material to be conveyed (e.g. coal) is transported by means of scrapers 20 as far as the main drive, and in bottom race 54B the scrapers run back to the auxiliary drive. The constantly changing load conditions in the top race 54A cause the tension in the top race 54A and bottom race 54B of conveyor 16 to vary.

In order to detect the tension of conveyor 16, a sensor, indicated overall by 60, is located on the frame of return station 51, which forms the auxiliary drive. The sensor has a sliding body or sensor body 62 with a curved sliding surface 61, which is coupled with a shaft 63 such that the sensor body 62 cannot be turned, said shaft reaching obliquely over the conveying trough and return trough for scraper conveyor 16 in top race 54 A of machine frame 51 of the chain conveyor. Shaft 63 is supported in bearing blocks 64, one of which is indicated schematically at the rear side face of return station 51. The weight of sensor body 62 causes its sliding surface 61 to be directly in contact with the upper face of a scraper 20 or with the upper face of vertical chain links 57 in the area of the measuring zone. At the same time, shaft 63, supported in bearing blocks 64 such that it can swivel, forms a measuring shaft, and by means of shaft encoder 65 the relative position of measuring shaft 63 and thus also the relative position or swiveled position of sensor body 62 rigidly coupled with it may be detected and transmitted to the evaluation and control unit 72 via signal line 71. Depending on the measurement signal of shaft encoder 65, evaluation and control unit 72 then activates tensioning drive 55 of return station 51 via signal line 75.

In an extensive zone within top race 54A of return station 51, referred to below as the measurement zone, and extending between points 67 and 68 in the drawing marked with double arrows, scraper conveyor 16 has vertical play. In other words, between point 67 and point 68 along the track in top race 54A, conveyor 16 can essentially move freely in a vertical direction, i.e. perpendicularly to the bottom of top race 73, 74.

In the embodiment shown, the scraper chain is running with optimum tension, i.e. some chain links in the measuring zone are slightly lifted away from the bottom of top race 74. When the chain is dangling, on the other hand, chain links 57, 58 and scrapers 59 within the area of the measuring zone and in the area of the machine frame are in contact at every point with the bottom of top race 73 or 74 of return station 51, and sensor body 62 is at its largest downwards deflection. This state is detected by evaluation and control device 72 and tensioning drive 55 is extended. If the tension of scraper conveyor 16 increases, vertical and horizontal chain links 57, 58 together with scrapers 59 of scraper conveyor 16 may move even higher in the measuring zone, due to the absence of restrictive guidance and the existing vertical play (67 or 68), which causes sensor body 62 to be swiveled clockwise and this deflection to be detected by shaft encoder 65 and transmitted to evaluation and control device 72 as a measurement signal. If the chain reaches a preset tension corresponding to that of a tight chain, this is detected directly by shaft encoder 65 as a result of the greater deflection of sensor body 62, and evaluation and control device 72 then activates tensioning drive 55, in some cases via a closed-loop control algorithm, through signal line 75 such that tensioning cylinder 56 is retracted in order to reduce the tension in scraper conveyor 16.

Other mechanisms for monitoring chain tension include those shown in U.S. Pat. No. 5,505,293 and in U.S. Pat. No. 4,657,131.

In some existing constructions, load sensing pads are positioned in a wear strip of a top flange in the moveable end frame. However, this positioning exposes the pads to overheating resulting from friction. These load pads are also subjected to the full impact forces generated from each flight member passing the load pad. In addition, in such constructions, the chain typically needs to be set at the highest load to accurately measure the amount of slack generated as the chain is run, and setting the tension at the highest loading increases inter-link wear, thereby reducing the life of the chain.

SUMMARY

This disclosure takes as its starting point the typical longwall conveyor described above in which the delivery end is fixed and the return end has a telescopic sliding frame. An object of this disclosure may be to provide a device for detecting and adjusting the tension of the scraper chain, which determines the tension reliably and simply. Another object of this disclosure may be to provide such a device that reliably senses chain tension while at the same time not adversely affecting the chain path.

This disclosure may also provide a means of identifying broken chain as it leaves the return sprocket and enters the top race of the conveyor. When detected, the chain can be stopped automatically by the armored face conveyor control system, to avoid the potential for further damage, and warn the operators that repair of the chain is required.

Another object of this disclosure may be to provide sliding frames at both ends of the conveyor to allow the conveyor ends to be independently adjusted to each end of the coal block, while maintaining good chain tension and control.

Providing the delivery and return end frames with a telescopic section addresses the problem of face creep by allowing the operator to quickly adjust the position of both ends of the conveyor, thus offsetting the effects of face creep. This may be important on conventional end discharge conveyor systems, where the correct relationship between the longwall discharge conveyor and an auxiliary cross conveyor (beam stage loader) must be maintained. This problem presents an increasing challenge where there are two longwall conveyors operating side by side, which is often the case with sub-level caving or longwall to coal caving.

In one independent embodiment, a spring assembly is provided for a sensor assembly in an endless conveyor. The conveyor includes a frame, at least one chain, and a plurality of flights coupled to the chain. The sensor assembly includes a moveable arm and a sensor. The spring assembly may generally include a pin passing through the arm, a nut for securing the arm relative to the pin, and a spring element for applying a pre-load force on the arm, and the spring element may be adjustable to change the pre-load force.

In another independent embodiment, a chain tension sensor is provided for a chain conveyor having a frame and a chain having a plurality of flights. The tension sensor includes a reaction arm pivotably coupled to the frame, flights contacting the reaction arm exerting a force on the reaction arm in a first direction; a load sensing pin coupled to the reaction arm and operable to sense the force exerted on the reaction arm; and a spring assembly coupled between the frame and the reaction arm to bias the reaction arm away from the frame.

Independent aspects of the invention will become apparent by consideration of the detailed description, claims and accompanying drawings.

BRIEF DESCRIPTION OF THE DRAWINGS

FIG. 5 is a perspective view of the tension sensor shown in FIG. 4, as mounted at the return end of a conveyor.

DETAILED DESCRIPTION

Before any independent embodiments of the invention are explained in detail, it is to be understood that the invention is not limited in its application to the details of construction and the arrangement of components set forth in the following description or illustrated in the following drawings. The invention is capable of other independent embodiments and of being practiced or of being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Further, it is to be understood that such terms as "forward", "rearward", "left", "right", "upward" and "downward", etc., are words of convenience and are not to be construed as limiting terms.

Figure 2:
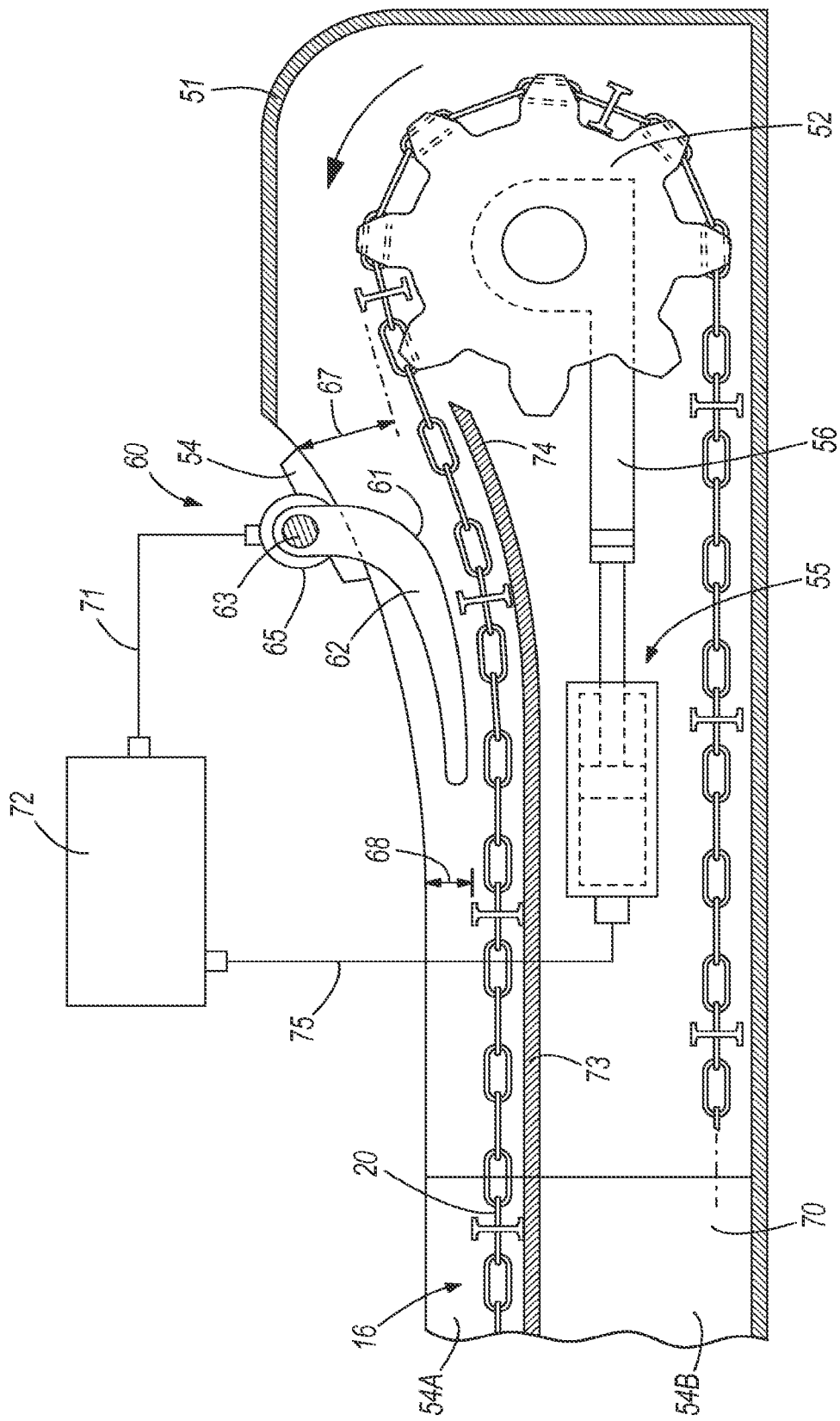
FIG. 2 is a schematic view of a prior art tension sensor for detecting and tensioning a scraper chain.
Figure 3:
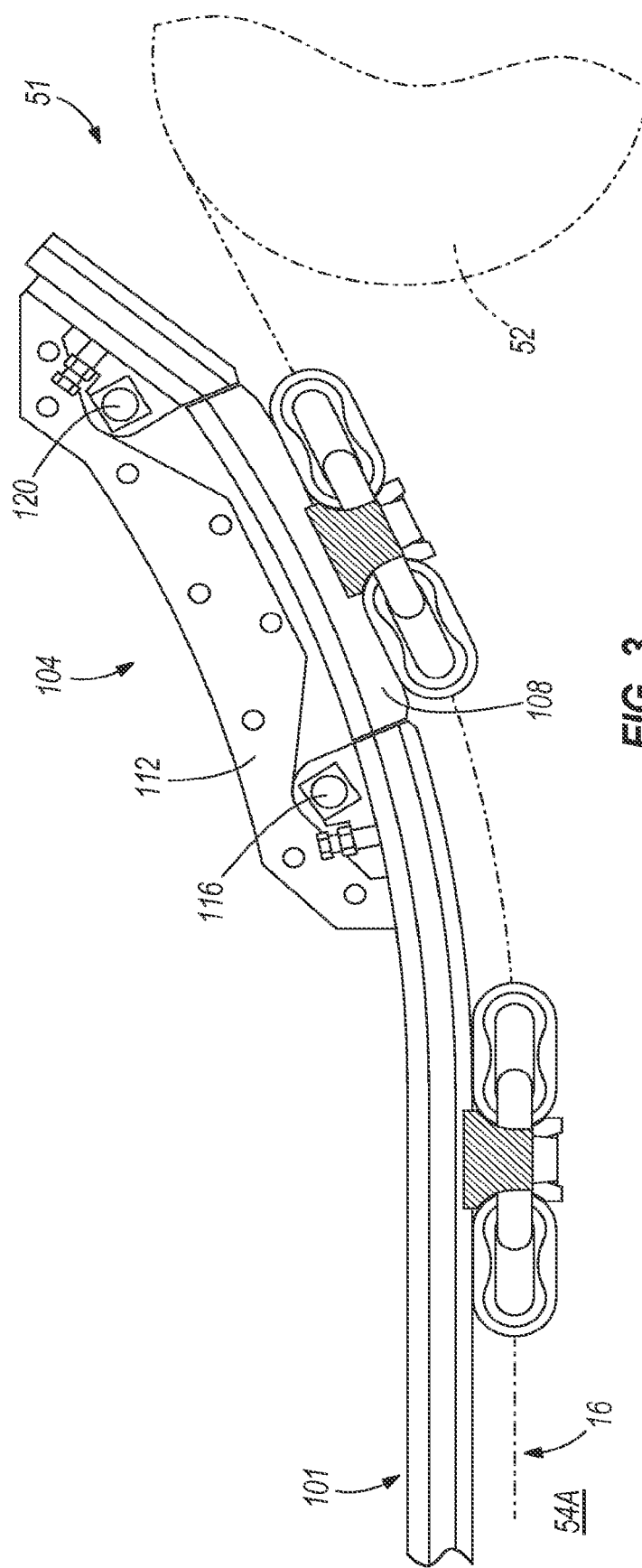
FIG. 3 is a plan view of an improved tension sensor.

FIG. 3 illustrates an improved version of the tension sensing means 60 shown in FIG. 2. Conventionally, to allow for optimum use of the length of the tailgate or return end or station 51, a wear strip 101 is installed to guide the conveyor 16 down to the track or race 54A level. The tensioning means, or tension sensor 104, of FIG. 3, comprises a wear strip 101 including a wear plate 108 that contacts the top surface of the conveyor 16.

Figure 1:
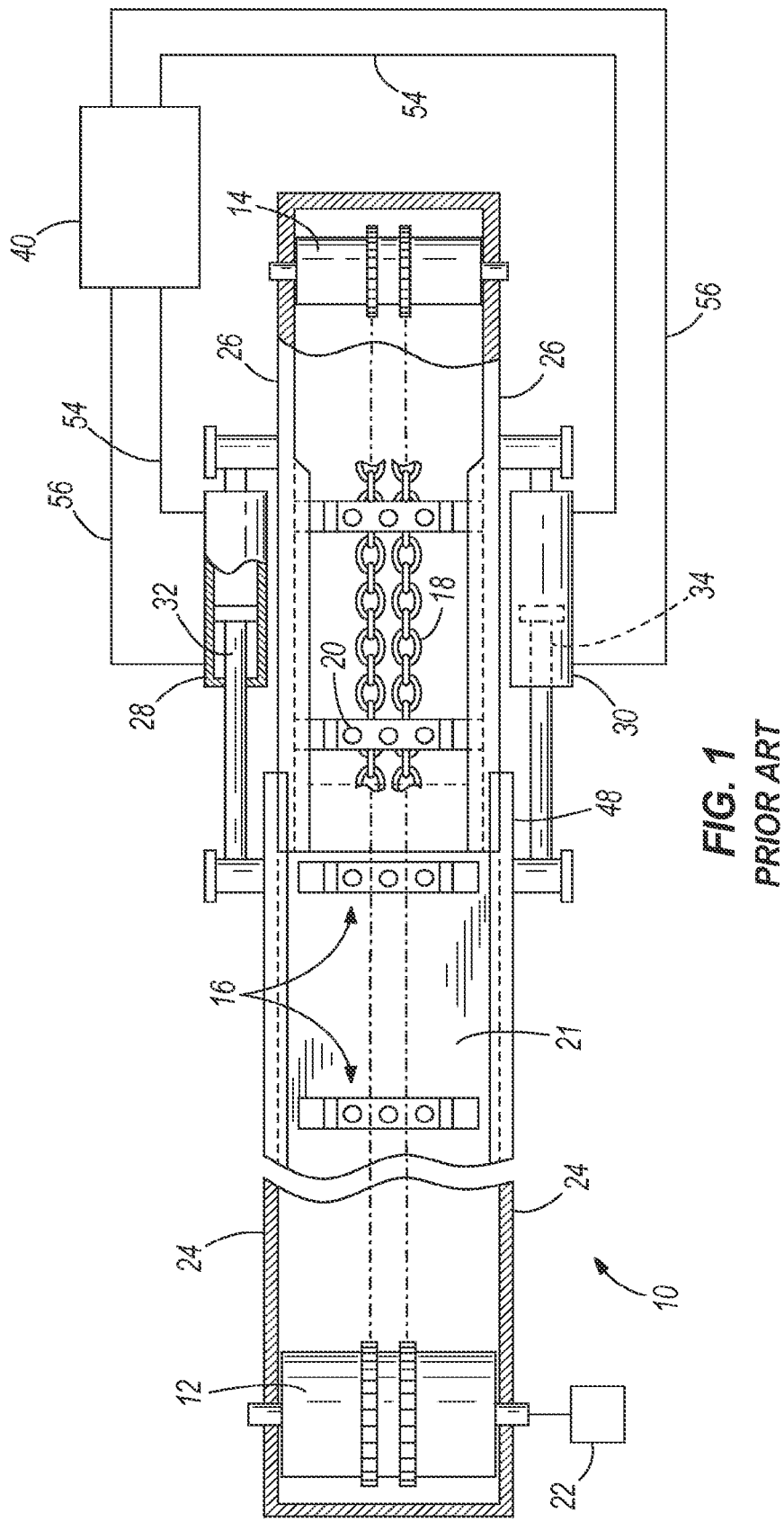
FIG. 1 is a plan view of a prior art delivery discharge end scraper chain conveyor arrangement.

The wear plate 108 is supported by a wear strip support 112, and the wear plate 108 is connected to the wear strip support 112 by a pin 116 at one end and a load-sensing pin 120 at the other end. The wear plate 108 engages the top surface of the conveyor 16, and changes the path or trajectory of the movement of the conveyor 16. This contact and change in direction of the conveyor 16 causes a force to be applied on the wear plate 108. The load-sensing pin 120 that connects the wear plate 108 to the wear strip support 112 senses this force. The output from the load-sensing pin 120 is then be used to determine the tension of the conveyor 16, and to adjust the tension, as needed, using any conventional chain tensioning system, such as the joint 48 and pistons 32 and 34 and circuitry of FIG. 1.

Figure 4:
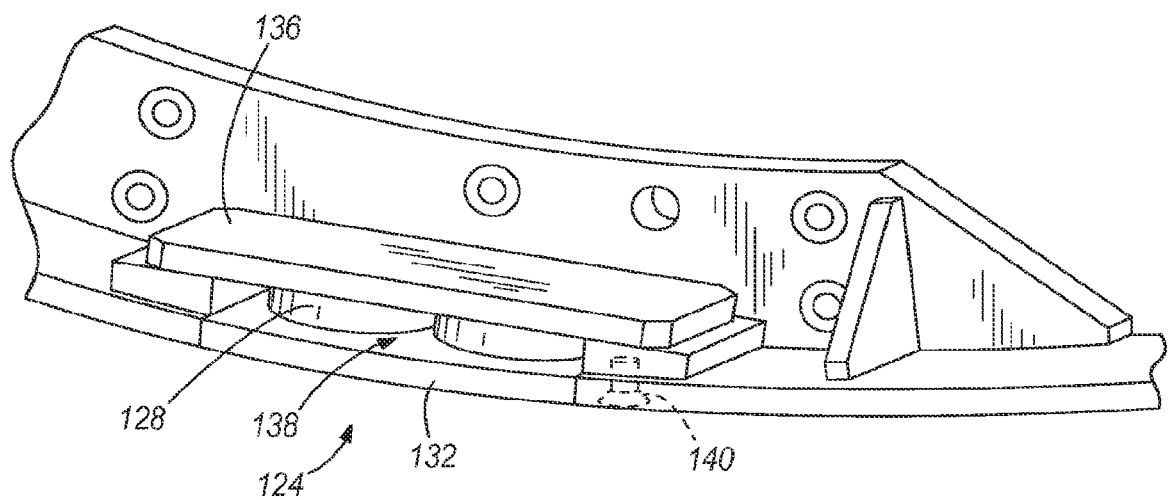
FIG. 4 is a perspective view of an alternate embodiment of the tension sensor shown in FIG. 3.
Figure 6:
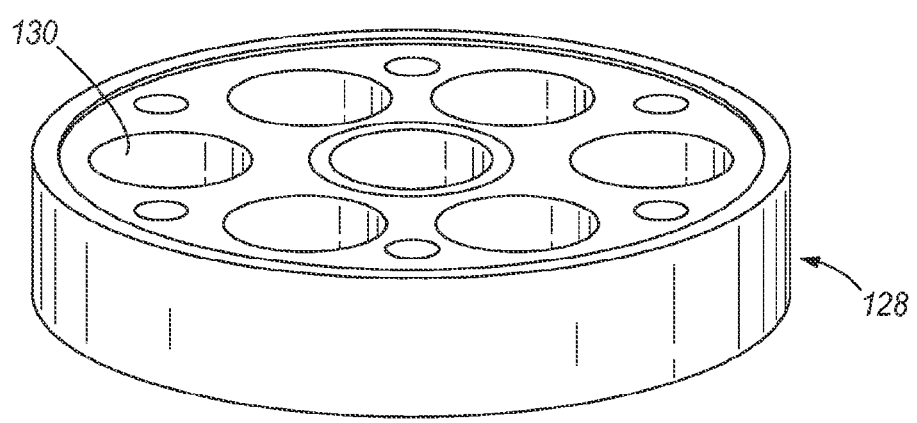
FIG. 6 is a perspective view of a load cell used in the tension sensor of FIGS. 4 and 5.

An alternate and preferred embodiment 124 of the tension sensor is illustrated in FIG. 4. In FIG. 4, a load cell 128 is located between a wear plate 132 and a wear strip support 136. The load cell 128, which is illustrated in FIG. 6, is a cylinder including a plurality of spaced apart passageways 130 through the cylinder. Within the passageways are load sensors (not shown), which measure the compression force on the load cell 128. By placing the load cell 128 between the wear plate 132 and the wear strip support 136, the load cell 128 responds to the force applied to the wear plate 132 by the conveyor 16. In order to provide redundancy, as shown in the preferred embodiment illustrated in FIG. 4, two spaced apart load cells 128 are placed between the wear plate 132 and the wear strip support 136. More particularly, the wear strip support 136 includes a cavity 138 that receives the load cells 128, and the wear plate 132 is connected to the wear strip support 136 by means of a screw 140.

FIG. 5 illustrates a perspective view of the load sensor 124 mounted on the conveyor apparatus 10 at the return end 51. As shown, the cavity 138 receiving the load cells 128 can be formed by a plate 142 secured to the wear strip support 36. This provides ready access to the load cells 128 from adjacent the conveyor apparatus 10, without the need for significant disassembly of conveyor parts. This thus permits ready access and repair of the tension sensor 124, when the need arises.

Figure 7:
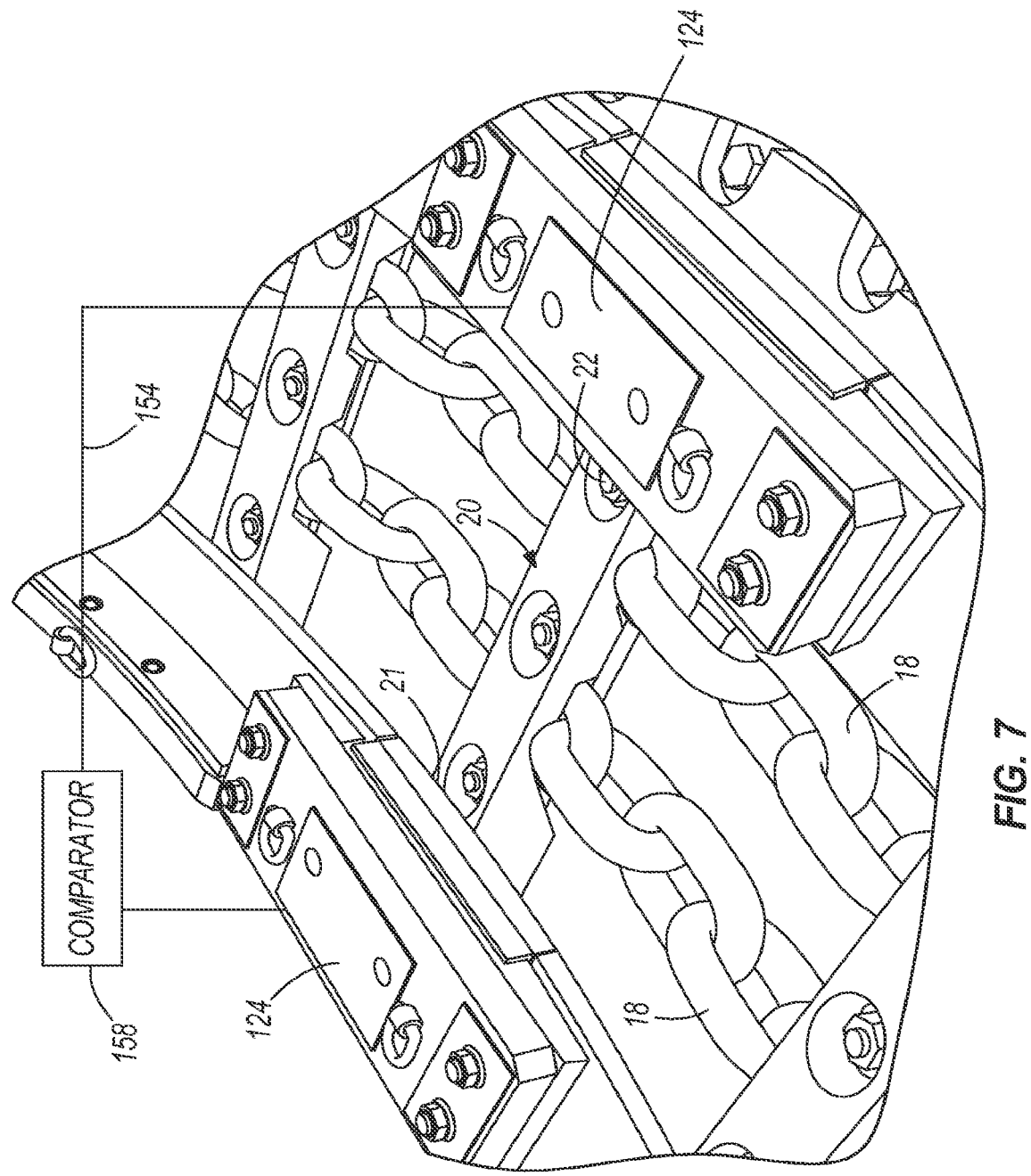
FIG. 7 is a schematic top view of the chain, two tension sensors and a tension control.

The disclosure also illustrates, in FIG. 7, the providing of two such tension sensors on such a conveyor apparatus 10. More particularly, in this embodiment, the conveyor 16 includes the two spaced apart chains 18, and the plurality of flights or flight bars 20 that are connected and spaced apart but between the two chains 18. Each conveyor flight 20 has a first end and a second end. Each flight bar end is spaced apart from its respective adjacent chain. A tension sensor, such as the tension sensor illustrated in FIGS. 2, 3 and 4 above, is provided in a respective wear strip for each one of the two conveyor chains 18. Each tension sensor 124 is electrically connected via a line 154 to a comparator 158.

In the preferred embodiment, as illustrated in FIG. 7, the part of the conveyor that contacts the tension sensor 124 is the end or tip of the flight bar 20. In other embodiments, not shown, a tension sensor 124 can be placed above each of the chains, instead of the flight tips. The tip of the flight bar 20 will only contact the wear strip intermittently. As a result, the tension sensor 124 will only produce intermittent signals.

To eliminate transient load spikes and to allow for the odd missing flight bar 20, the tension sensor 124 collects a rolling average reading over a number of flight bars. As each flight bar tip passes along the load sensor, even at a constant chain tension, the signal varies due to the changing geometry of the system. The tension sensor 124 records the peak signal value as each flight bar 20 passes over the wear plate 132. If the rolling average peak reading is too low, then the tension means opens the joint 48 to stretch the chain, or vice versa. The tension means is initialized by establishing a required peak signal value by stopping the conveyor with a flight bar under the sensor, fitting a temporary load transducer to the chain itself, and then moving the joint 48 to tension the static chain. When the chain is at the required tension, the tension sensor 124 stores the signal, and it is this signal value that the tension sensor 124 maintains while the conveyor is running.

The above overview is a simplified version of the sensor signal management system, and applies to steady chain load increase or decrease during the coal cutting cycle. The tension sensor 124 must also deal with special events such as starting a full conveyor or the rapid unloading of a conveyor, like when the shearer stops cutting. Collecting a rolling average signal cannot respond quickly enough to deal with these events, so advance action must be taken. For example, the sprocket is extended to significantly stretch the chain before loaded conveyor startup to prevent generation of slack chain.

In the event of a chain break, the tension in the two chains 18 will be different. The outputs of the tension sensors 124 are compared by a comparing means, comparator 158, and in the event of a significant difference, the operation of the conveying apparatus 10 can be stopped so the broken chain can be repaired. In the preferred embodiment, the tension sensors 124 are provided adjacent the top race of the return end of the conveyor apparatus. If additional sensors or sensing of the tension at other locations in the conveying apparatus is desired, other tension sensors 124, in other locations, can be used. The use of the two tension sensors 124 is also beneficial, for the output from the tension sensors 124 can be averaged to produce a more accurate indication of overall conveyor tension. The comparator 158 forms a part of the chain tensioning system such as the joint 48 and pistons 32 and 34 and circuitry of FIG. 1.

Figure 8:
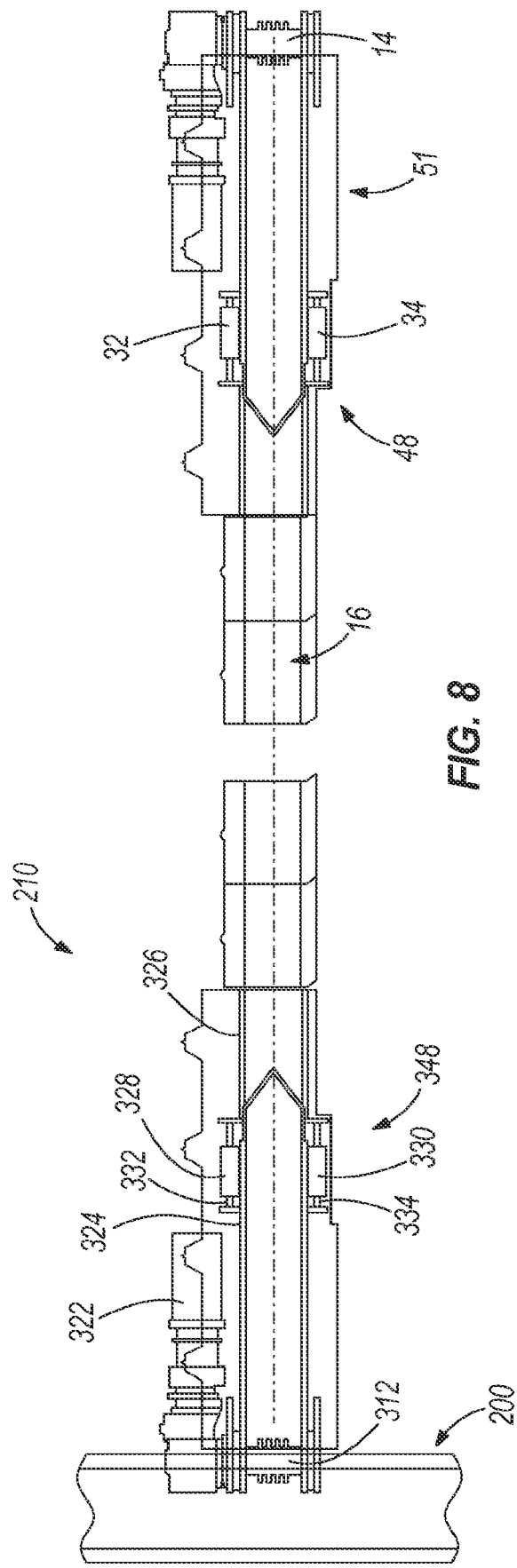
FIG. 8 is a top view of a conveyor and a secondary or auxiliary conveyor.

As illustrated in FIG. 8, an auxiliary or secondary conveyor 200 is located at one end of a conveyor apparatus 210. The material on the conveyor 16 leaves the conveyor and is transferred to the auxiliary conveyor 200. During operation of the conveyor apparatus 210, the location of the conveyor apparatus 210 may move relative to the location of the auxiliary conveyor 200. Currently, operators need to make various adjustments in order to try to accommodate such movement. This can result in difficulty maintaining conveyor operation.

In order to accommodate some movement of the conveyor apparatus 210 relative to the auxiliary conveyor 200, the conveyor apparatus frame accommodates sliding movement at both ends. At one end, the sliding movement adjusts the tension of the conveyor 16, and sliding movement at the other end accommodates movement of the conveyor apparatus 210 relative to the auxiliary conveyor 200. If the conveyor apparatus 210 moves relative to the auxiliary conveyor 200, an operator can move the sliding end of the conveyor 210 adjacent the auxiliary conveyor 200. Movement of the sliding end of the conveyor 210 can also be occasioned by the use of tensioning means, as described hereinafter, as used on the tensioning end 51 of the conveyor 16. Only in this instance, the movement is not intended to affect the tension of the conveyor 16, but the location of the end of the conveyor apparatus 210 relative to the auxiliary conveyor 200. When movement at this end of the conveyor occurs, the chain tension does change, so the other end of the conveyor apparatus 210 is adjusted by the automatic tensioning means to return the conveyor 16 back to the appropriate tension. Movement of the sliding end of the conveyor 210 adjacent to the auxiliary conveyor 200 must overcome the maximum working chain tensions (which are at there highest as these top chains reach this frame; plus significant sliding friction due to the typical large size and weight of the Main gate equipment.

Figure 11:
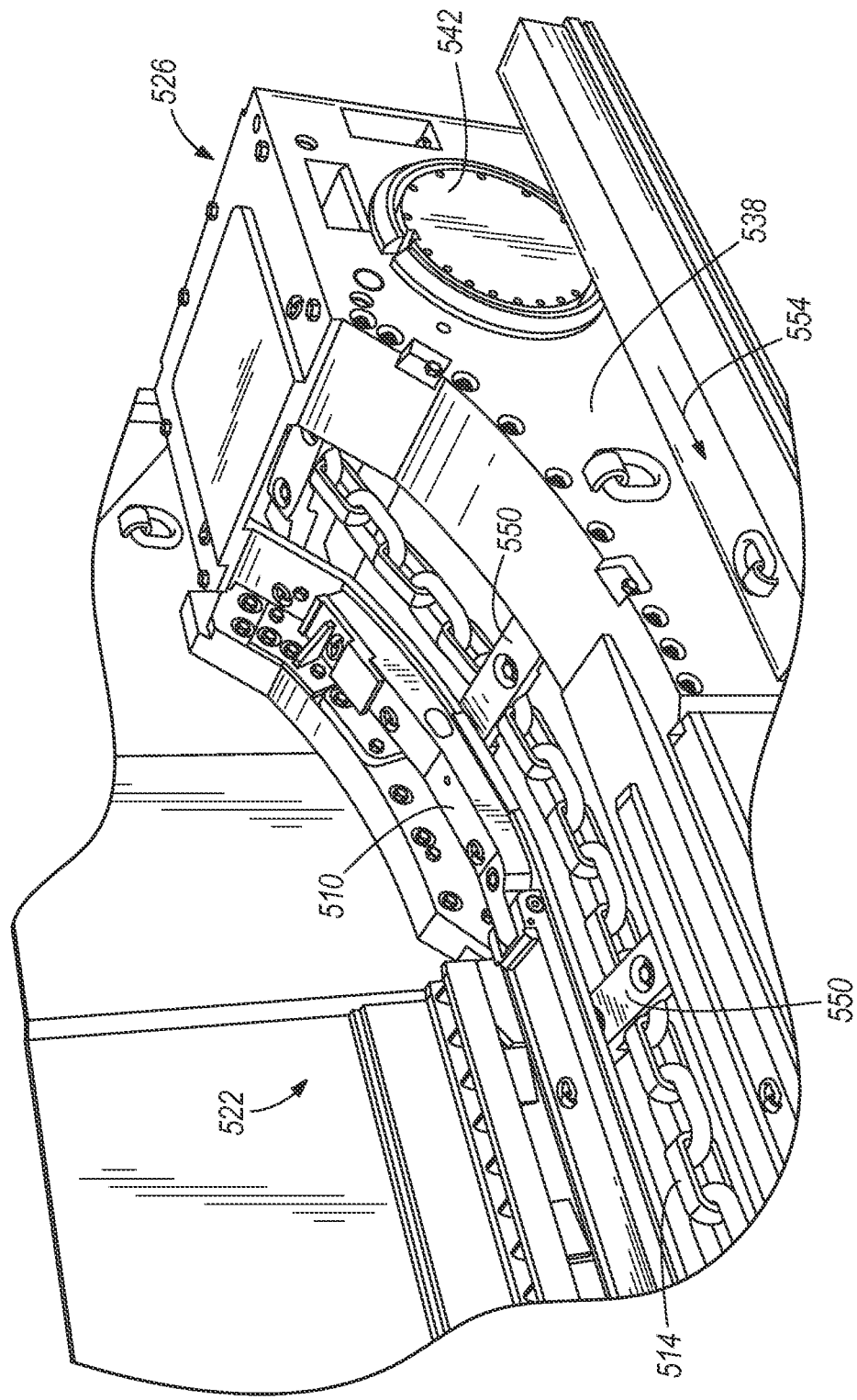
FIG. 11 is a perspective view of an end frame of a chain conveyor.

More particularly, a driven drum/sprocket 312 is appropriately coupled to a conveyor drive motor 322. Operation of motor 322 causes the sprocket intermeshing with the dual chains 18 to advance the conveyor 16. More particularly, as illustrated in FIGS. 8 and 11, in addition to the hydraulic pistons 32 and 34 spanning the joint 48 at the return end 51, a pair of sidewalls 324 forming a first portion of a "split frame" of the main gate end of the conveyor apparatus serves to rotatably support the drum/sprocket 312. The sidewalls 324 are illustrated as being telescopingly engaged with a second pair of sidewalls 326 forming a second portion of the frame and, which collectively with sidewalls 324, comprise the aforementioned split frame. The telescoping joint, indicated generally by character numeral 348, permits the frame portions to be moved relative to one another.

Relative movement at the joint 348 between the adjacent sidewalls 324 and 326 thus causes the distance span between the drum/sprockets 312 and 14 to vary accordingly. The conveyor 16 can be provided with increased or reduced tension depending upon the direction of adjusting movement of the supporting drum/sprockets with respect to each other. To provide this relative movement, the conveyor assembly 310 has a pair of hydraulic cylinders 328 and 330, each mounted on and secured to an adjacent sidewall 326. The cylinders have respective pistons 332 and 334, each of which is operatively coupled to a sidewall 324 in any known and expedient manner.

Figure 9:
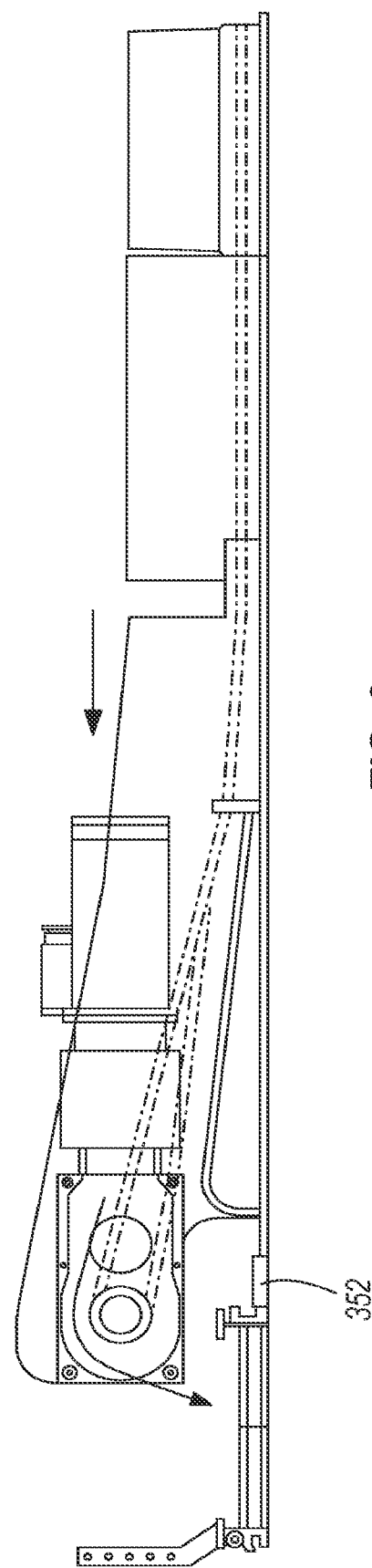
FIG. 9 is a side view of the conveyor and auxiliary conveyor shown in FIG. 8.

The location of the conveyor apparatus relative to the auxiliary conveyor is further illustrated in FIG. 9. If desired, in lieu of operator correction of the location of the conveyor apparatus, the conveyor apparatus can be physically connected by a bar 352 to the auxiliary conveyor. In this instance, tension is maintained at this end of the conveyor by some tensioning means, such as the tensioning means previously described. But in order to accommodate some movement in the event the auxiliary conveyor and main conveyor change location, either a hydraulic accumulator (now shown), or some relief valve (now shown) must be provided in the hydraulic tensioning means in order to allow for the movement of this sliding end of the conveyor apparatus 210. When this end of the conveyor apparatus 210 adjusts by movement of the auxiliary conveyor 200, then tension is corrected, as described before, by the return end 51.

Figure 10A:
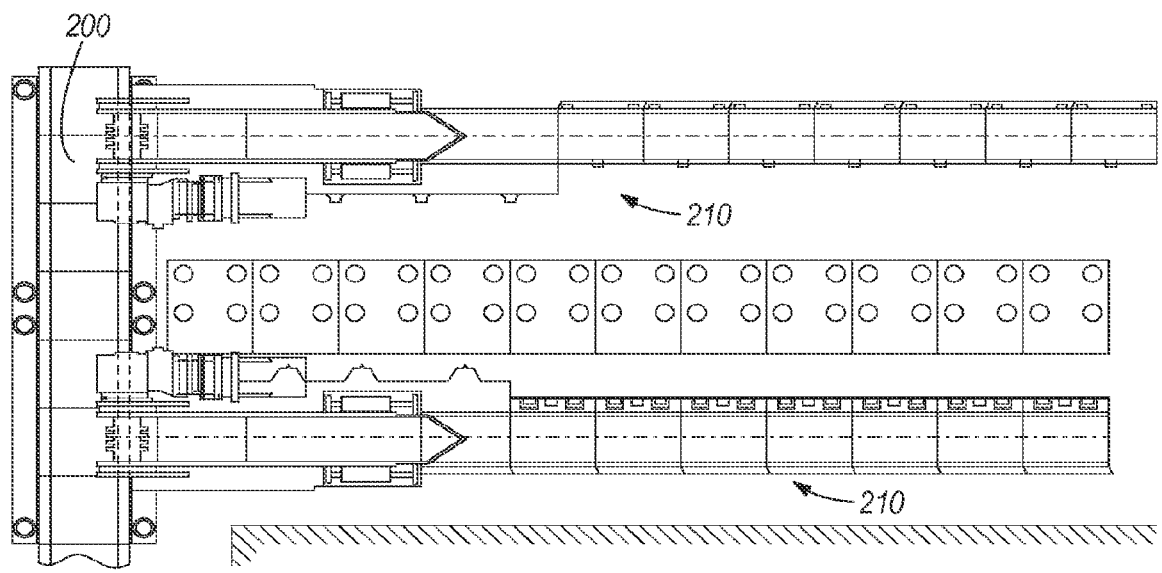
FIG. 10 is a top view of a double conveyor system.
Figure 10B:
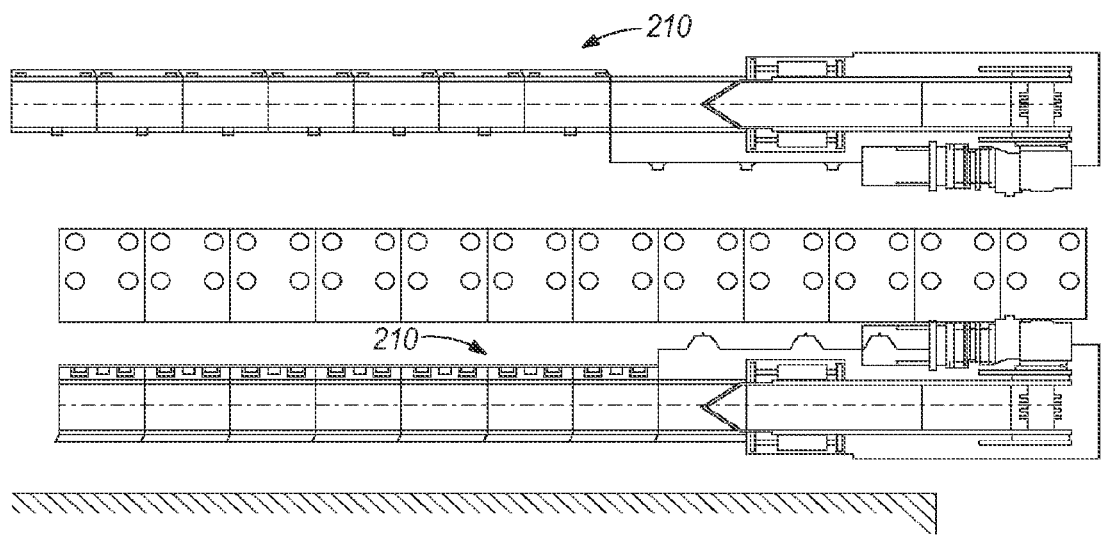

The problem of conveyor apparatus movement relative to the auxiliary conveyor is especially relevant where a pair of conveyor apparatus is used. As illustrated in FIGS. 10A and 10B, it is known to use one conveyor adjacent to a coal face, and a second conveyor apparatus behind the roof supports to collect coal that falls from the longwall roof as the longwall advances. In this instance, the double sliding frame ends would be used with both conveyor apparatus.

Additionally the frame-sliding 48 and 348 can be adjusted to correctly align the conveyor end with both edges of the coal block, moving both the return end frame and delivery end frame at the same time to maintain correct chain tension during this adjustment. This would not be a normal requirement or mode of operation as the position of the Return End Frame to coal block is less critical in most cases.

This aspect of the disclosure thus has the following benefits. Manual or automatic control of the delivery end frame sliding module makes fine adjustments for optimum discharge of material from the extendable longwall armored face conveyor to the cross beam stage loader conveyor.

Since the changes in the overall length of the conveyor, as a result of adjusting the delivery end sliding frame module will change the chain tension, adjustments must be in small increments and effected slowly to give the automatic chain tensioning system time to react. At all times it is the automatic chain tensioning system that controls and maintains correct chain tension, not the adjustment of the delivery end frame module.

In another embodiment, a sensor assembly 510 for detecting tension in a chain 514 is provided. This embodiment is shown in FIGS. 11-17, and all reference numbers begin at 500.

Figure 12:
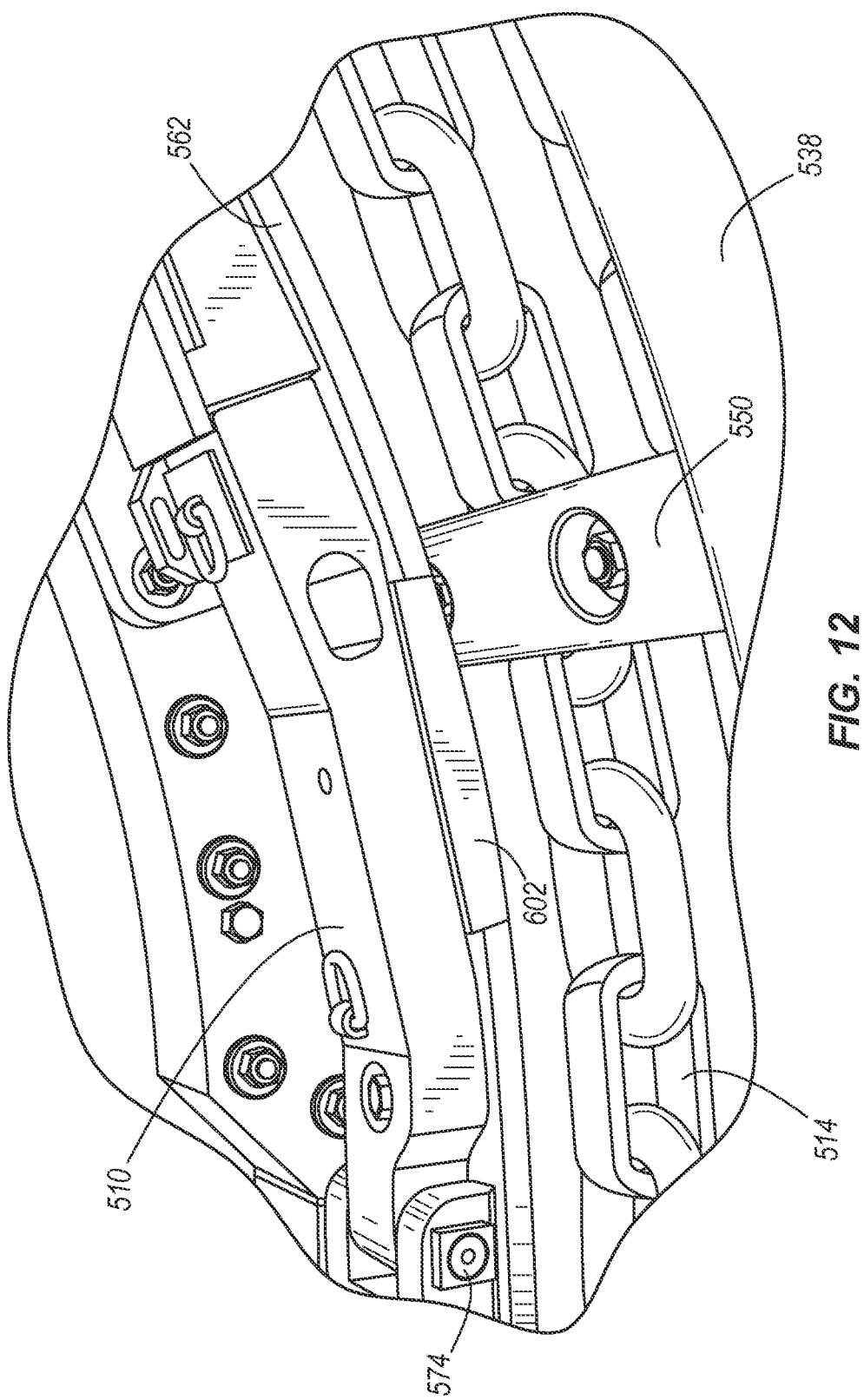
FIG. 12 is an enlarged view of the end frame of the chain conveyor of FIG. 11.
Figure 13:
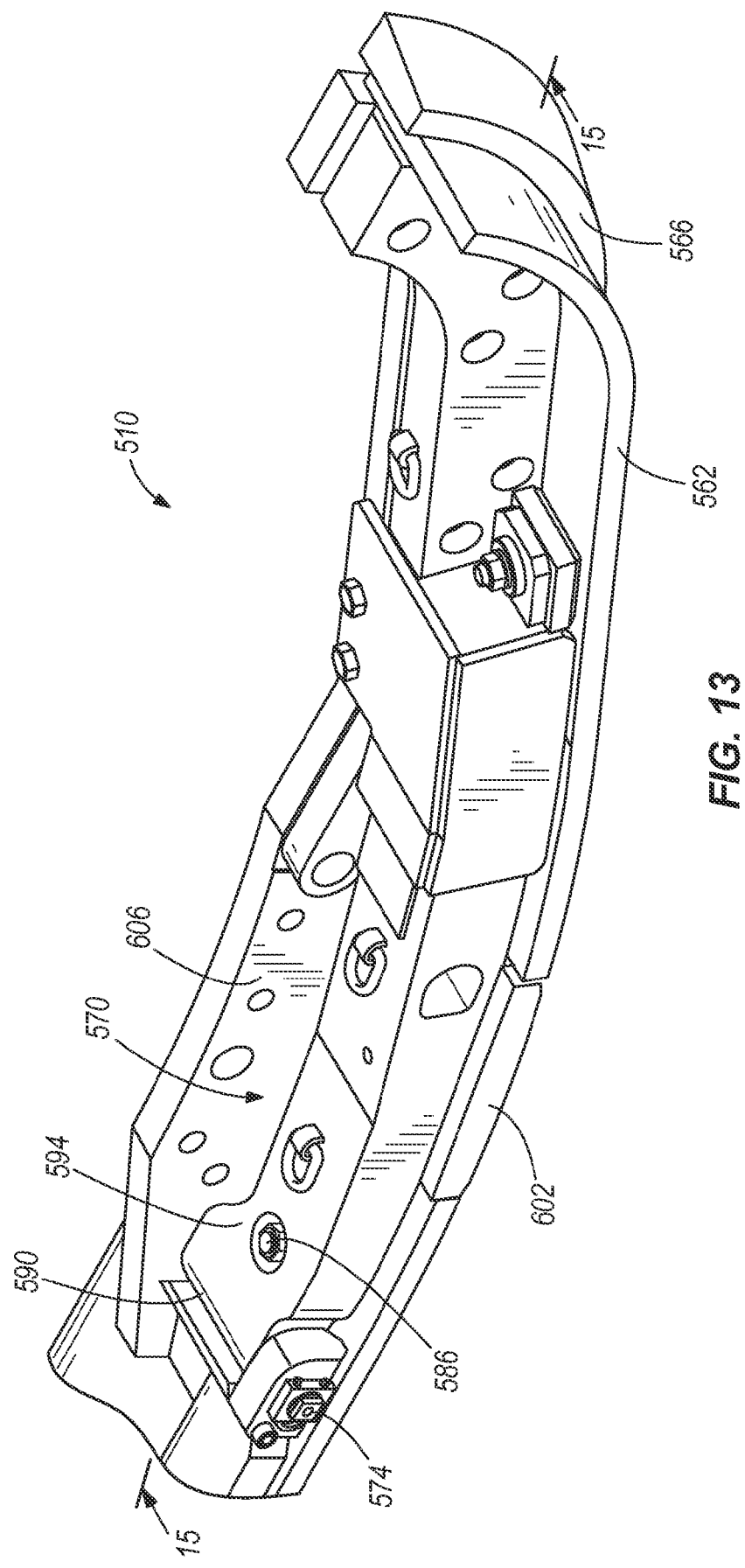
FIG. 13 is a perspective view of a sensor assembly.

FIGS. 11-12 illustrate a portion of a longwall conveyor 522 including a return end 526 (FIG. 11), a conveying element or chain 514 that travels between the return end 526 and a delivery end (not shown), and the sensor assembly 510 proximate the return end 526. The return end 526 includes a frame 538, an idler or take-up shaft 542 mounted on the frame 538, and at least one hydraulic actuator (not shown). The frame 538 moves with respect to the delivery end, between an inner retracted position and an outer extended position through the extension and retraction of the hydraulic actuator. The chain 514 passes around the take-up shaft 542 to travel in a continuous loop between the delivery end and the return end 526. The chain 514 includes a plurality of flight members 550 mounted on the chain 514 and spaced apart by a first distance in a direction of travel 554 of the chain 514.

As shown in FIGS. 13-16, the sensor assembly 510 is positioned adjacent a wear strip 562 of a flange portion 566 of the frame 538 and includes a reaction arm 570, a main support hinge pin 574, a reaction bracket 578 (FIGS. 14-16), a load sensing pin 582 (FIGS. 14-16), and a spring assembly 586.

The reaction arm 570 has a first end 590, a shoulder 594, a second end 598 (FIG. 14), and a load pad 602. The first end 590 is rotatably coupled to a secondary support plate 606 of the frame 538 by the main support hinge pin 574. The shoulder 594 is positioned proximate the first end 590. The second end 598 includes a hole 622 (FIGS. 14 and 15) extending from the second end 598 partially through the reaction arm 570 in a longitudinal direction. The load pad 602 is positioned intermediate the first end 590 and the second end 598. As shown in FIG. 12, the load pad 602 is positioned parallel to the wear strip 562 to contact the flight members 550 passing the wear strip 562, causing the reaction arm 570 to rotate about the hinge pin 574. The load pad 602 also provides a continuous guide surface to guide the flight members 550 as the flight members 550 travel around the take-up shaft 542.

The hinge pin 574 is mounted to the secondary support plate 606 of the frame 538 and is positioned substantially transverse to the direction of travel 554 of the chain 514. The hinge pin 574 restricts the motion of the reaction arm 570 in every direction except rotation (see arrow 630) about the hinge pin 574.

Figure 14:
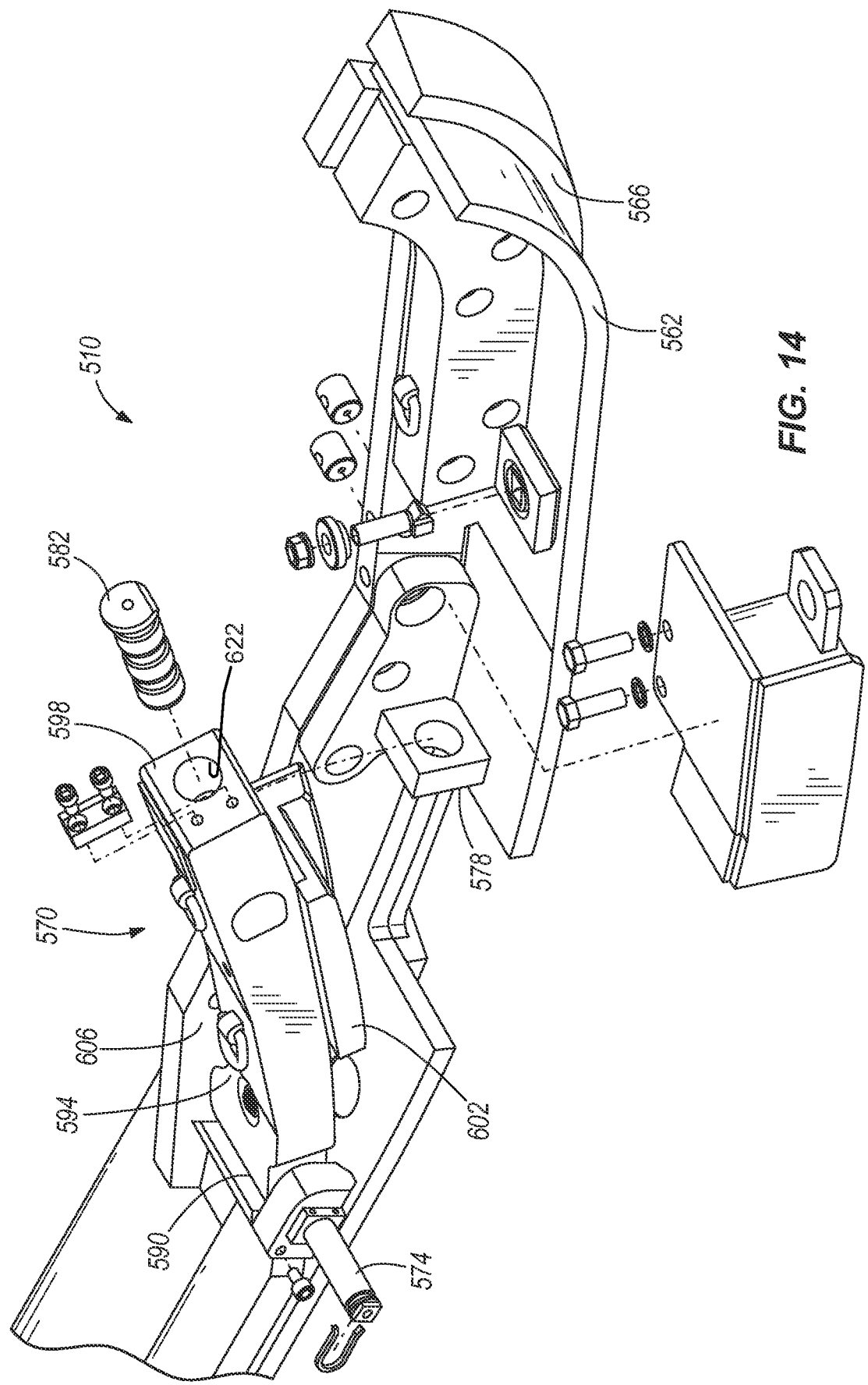
FIG. 14 is an assembly view of the sensor assembly shown in FIG. 13.
Figure 15:
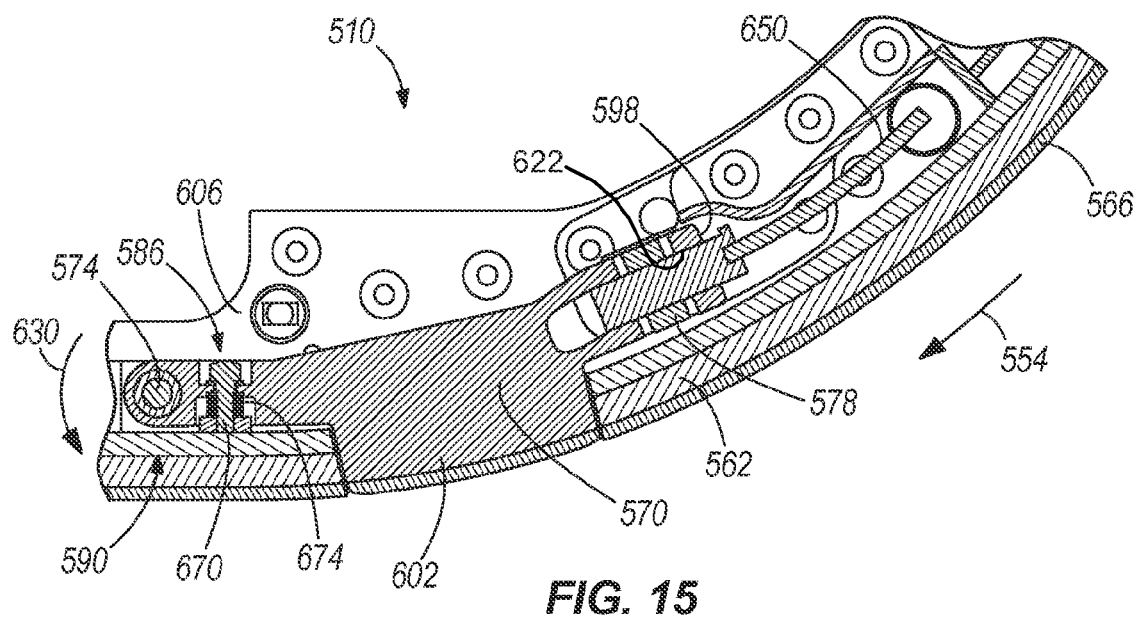
FIG. 15 is cross-sectional view of the sensor assembly shown in FIG. 13 taken along line 15-15.
Figure 16:
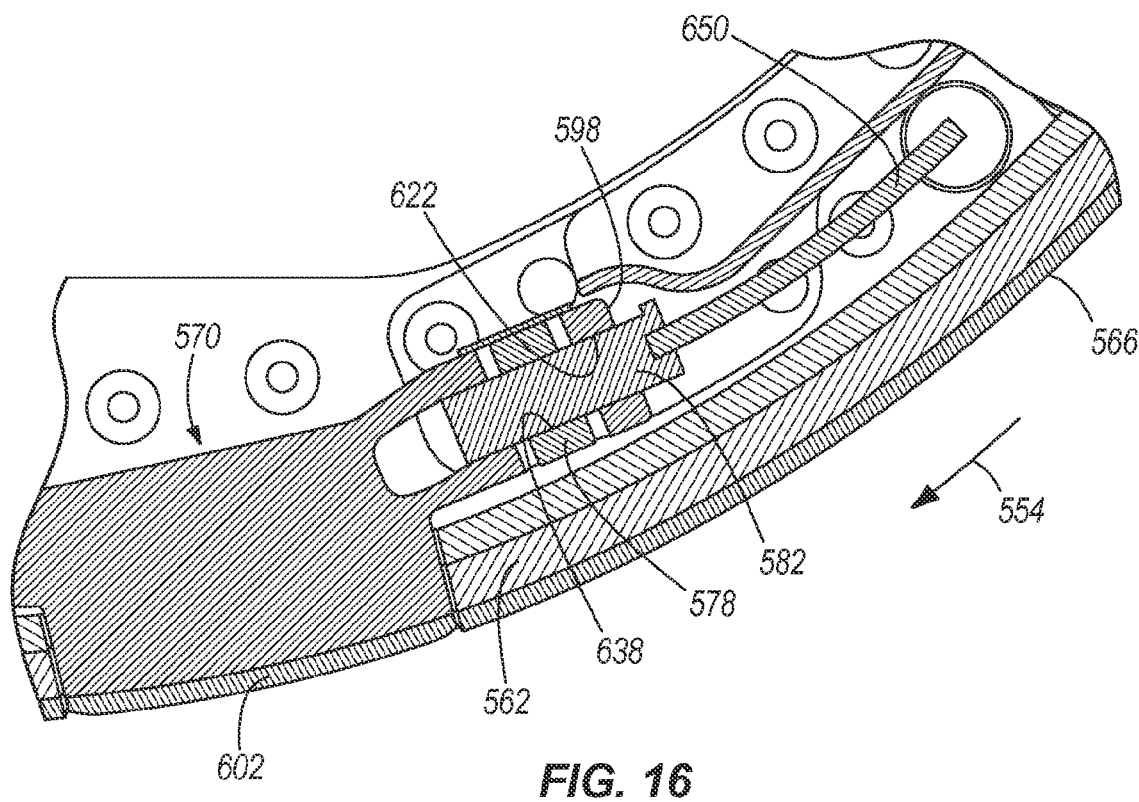
FIG. 16 is an enlarged cross-sectional view of the sensor assembly shown in FIG. 15.

As shown in FIGS. 14-16, the reaction bracket 578 is mounted to the secondary support plate 606 of the frame 538 and includes a slot 638. The reaction bracket 578 is configured to fit within the second end 598 of the reaction arm 570 such that the slot 638 is aligned with the hole 622 extending through the reaction arm 570. The load sensing pin 582 is positioned in the slot 638 of the reaction bracket 578 and within the hole 622 of the reaction arm 570. The load sensing pin 582 is therefore positioned substantially perpendicular to the hinge pin 574. The load sensing pin 582 is attached to a sensing cable 650 (FIGS. 15 and 16).

Figure 17:
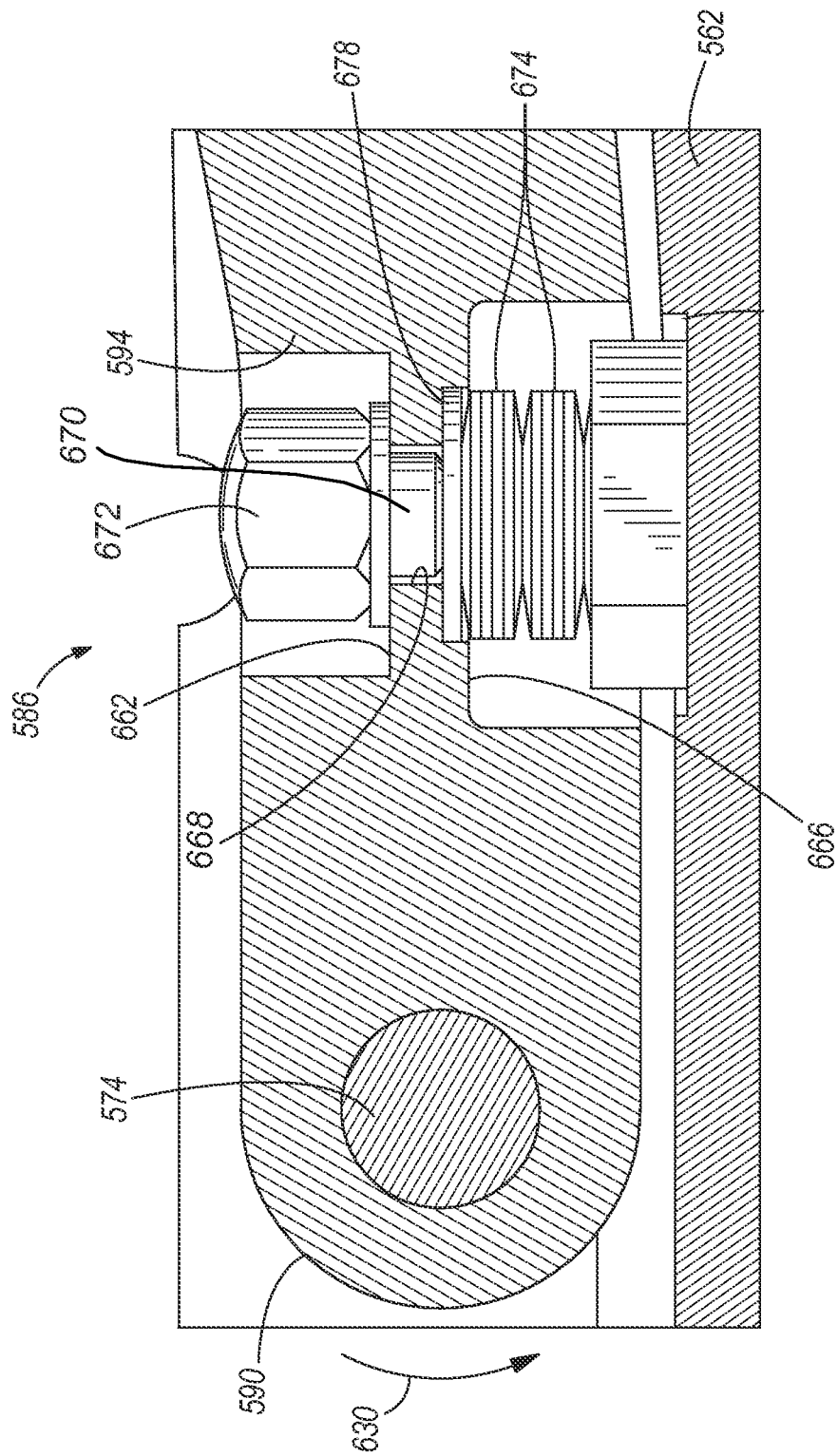
FIG. 17 is an enlarged cross-sectional view of the sensor assembly shown in FIG. 15.
Figure 18:
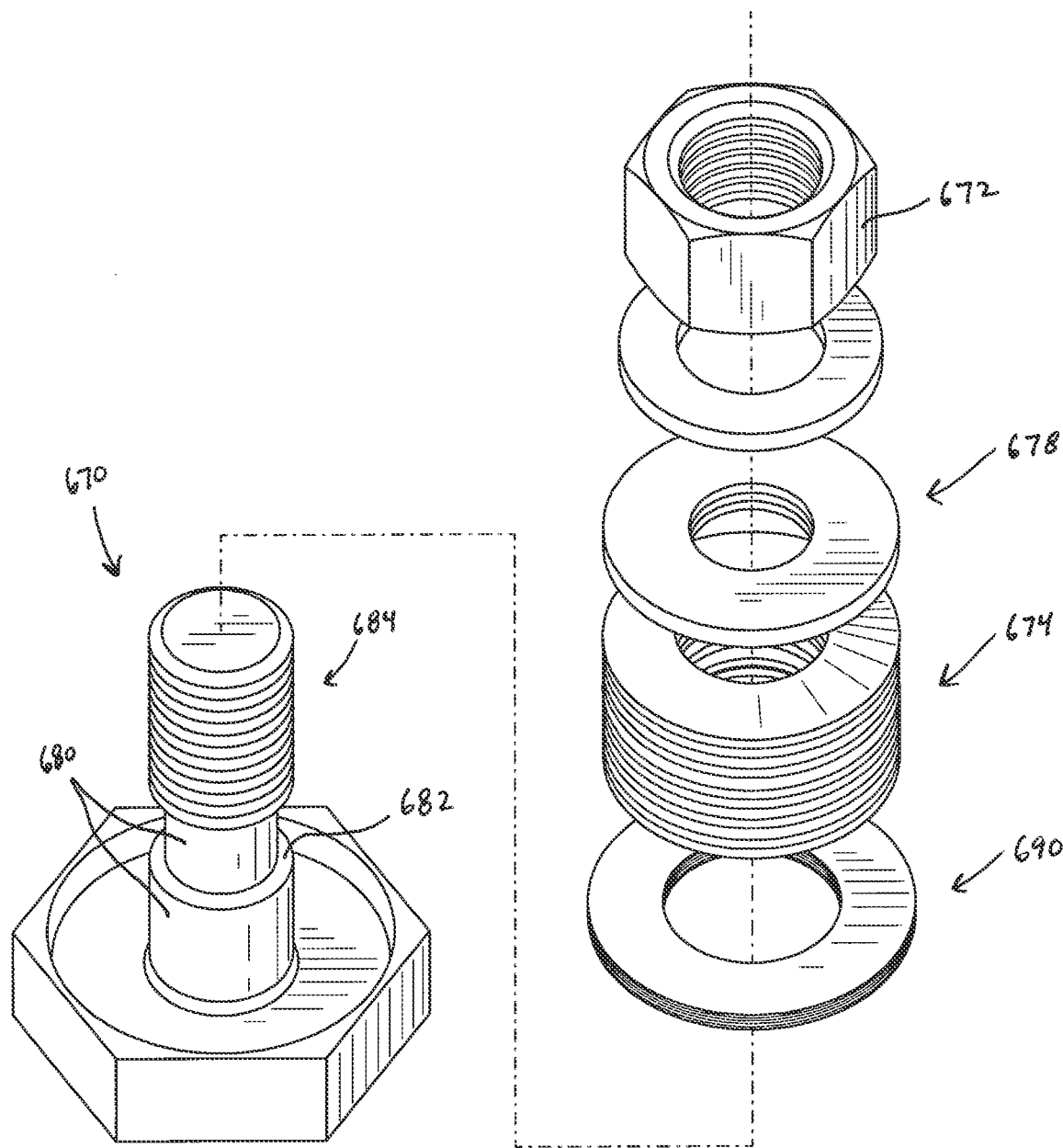
FIG. 18 is an exploded view of a spring assembly.

As shown in FIG. 17, the shoulder 594 includes a head side 662, a spring side 666, and a bore 668 extending between the head side 662 and the spring side 666 through the reaction arm 570 in a direction tangential to a direction of rotation 630 of the reaction arm 570 (i.e., perpendicular to the hinge pin 574). Referring to FIGS. 17 and 18, the spring assembly 586 includes a pin or bolt 670, a nut 672, a plurality of spring washers 674, and a retaining washer 678. The bolt 670 is coupled to the wear strip 562 and passes through the shoulder bore 668. The bolt 670 includes a smooth portion 680, a shoulder 682, and a threaded portion 684 for threadingly engaging the nut 672, which is tightened to secure the shoulder 594 with respect to the bolt 670.

The spring washers 674 are positioned around the bolt 670 adjacent the spring side 666, between the shoulder 594 and the wear strip 562. In the embodiment shown in FIG. 19, the bolt 670 includes a cavity recess 686 to reduce the material contact between the wear strip 562 and the bolt 670, thereby reducing the amount of heat transfer from the wear strip 562 to the bolt 670. The retaining washer 678 is positioned between the spring side 666 of the shoulder 594 and the spring washers 674. The retaining washer 678 is screwed onto the bolt 670 past the threaded portion 684 of the bolt 670, effectively "capturing" the spring washers 674 around the smooth portion 680. Each spring washer 674 has a generally frusto-conical shape that creates a spring force as the spring washer 674 is compressed. The compression of the spring washers 674 therefore applies a pre-loaded force to the reaction arm 570, biasing the reaction arm 570 away from the frame 538. The retaining washer 678 centers the top-most spring washers 674 with respect to the bolt 670.

Figure 19:
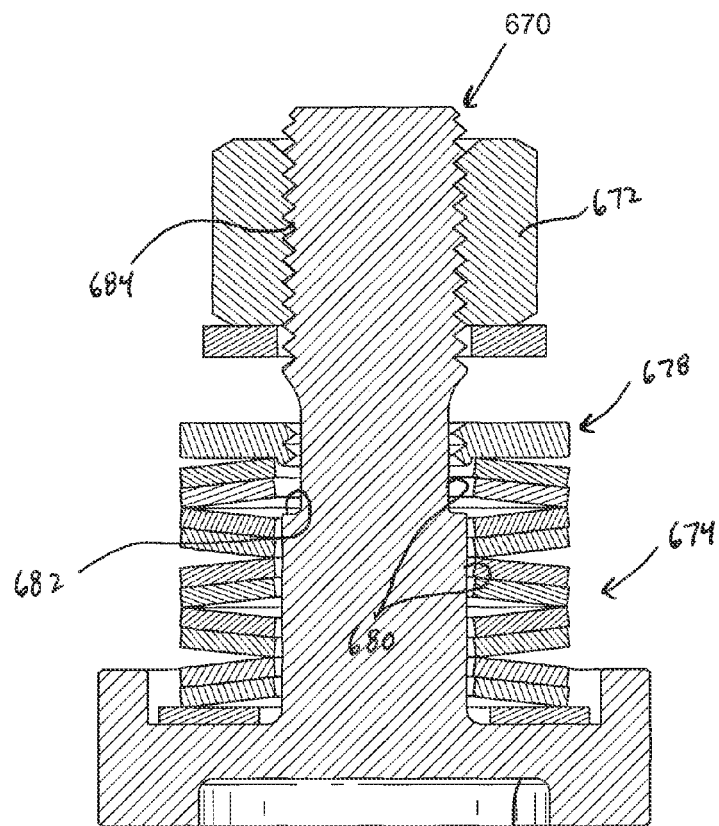
FIG. 19 is a cross-sectional view of the sensor assembly shown in FIG. 18.
Figure 20:
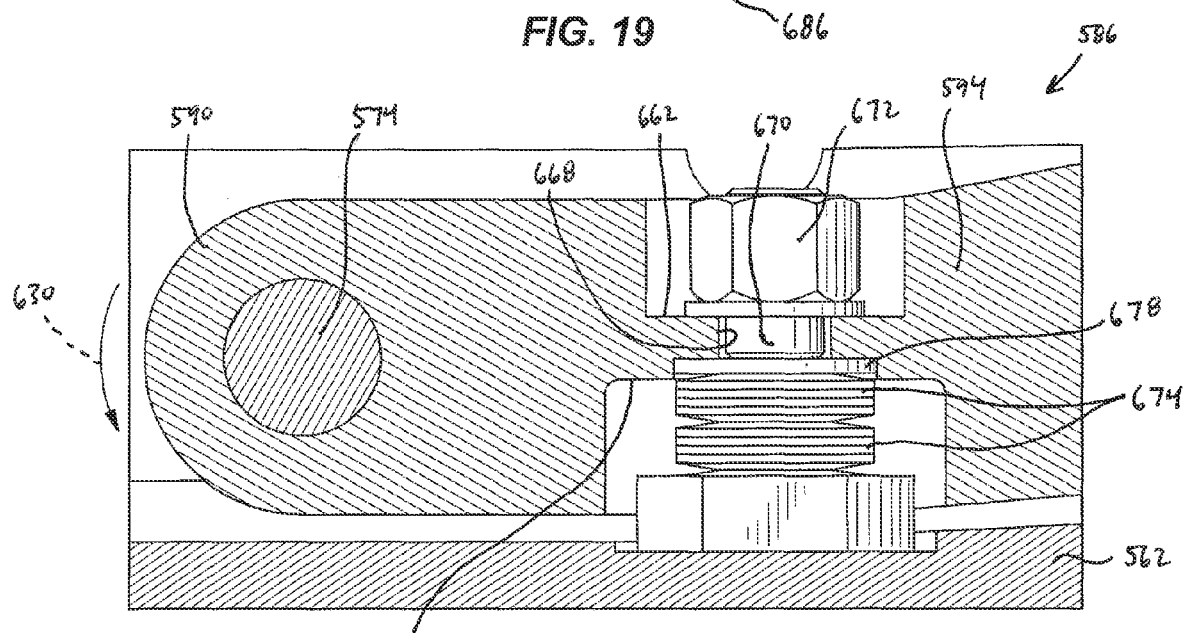
FIG. 20 is an enlarged cross-sectional view of a sensor assembly.

In the embodiment shown in FIG. 17, the nut 672 is capped in order to prevent the nut 672 from being tightened against the shoulder 594. This maintains a clearance between the nut 672 and the reaction arm 570, allowing the pre-load force of the spring washers 674 to be applied on the load pin 582. In another embodiment (see FIGS. 18-20), the nut 672 is open allowing the nut 672 to be tightened against the shoulder 594 (FIG. 20). As the nut 672 is tightened, the retaining washer 678 compresses each spring washer 674, and the reaction arm shoulder 594 is secured against the retaining washer 678. Tightening the nut 672 causes the retaining washer 678 to draw closer to the bolt shoulder 682 (FIG. 19). Once the retaining washer 678 contacts the bolt shoulder 682, the nut 672 cannot be tightened any further. In this way, the bolt shoulder 682 provides mechanical lock-out, preventing overcompression of the spring washers 674.

The spring washers 674 may be stacked in a number of configurations in order to obtain the desired pre-load force on the reaction arm 570. For instance, the spring washers 674 may be stacked in alternating sets such that the "peaks" of two washers 674 are against each other, and the "peaks" of the adjacent washers 674 are inverted with respect to the first two (see FIG. 19). The desired configuration can be accomplished using fewer or more washers 674 in each set. Alternatively, all of the washers 674 can be aligned in one direction. In another alternative, a single spring washer 674 may be used. In still other constructions, a different type or shape of spring may be used.

A plurality of shims 690 (see FIG. 18) may be added to the area between the retaining washer 678 and the cavity recess 686 in order to account for the build-up of tolerances in the bolted joint and/or to apply additional compressive force on the spring washer(s) 674.

During operation, the load pad 602 of the reaction arm 570 contacts the flight members 550 of the chain 514 as the flight members 550 pass between the return end 526 and the delivery end. In this manner, the load pad 602 is subjected to the vertical component of the chain tension. Contact with the flight members 550 causes the reaction arm 570 to rotate about the hinge pin 574.

Referring to FIG. 15, as the reaction arm 570 rotates in the direction of rotation 630, the second end 598 deflects upwardly, exerting an upward force on the load sensing pin 582. The reaction bracket 578 resists this deflection, exerting a downward force on the load sensing pin 582, thereby creating a shear load condition on the pin 582. The load sensing pin 582 senses the magnitude of the shear force and/or the strain and transmits a signal indicative of the force or strain through the sensing cable 650 to a chain controller (not shown). The chain controller then uses this information to determine the tension in the chain 514 and to calculate the necessary change in position of the return end frame 538 in order to maintain the desired tension in the chain 514.

The chain controller may be a component of a system for automatically controlling the conveyor 10, such as that described and illustrated in U.S. Provisional Patent Application No. 61/510,850, filed Jul. 22, 2011, the entire contents of which are included in parent U.S. Provisional Application No. 61/510,839, or in U.S. patent application Ser. No. 13/553, 215, filed Jul. 19, 2012, entitled Systems And Methods For Controlling A Conveyor In A Mining System, the entire contents of both of which are also hereby incorporated by reference.

The biasing force of the spring assembly 586 provides a pre-load force that can be calibrated. Instead of calibrating the tension to the maximum load the chain 514 may experience during operation (e.g., in one embodiment, approximately five tons; in other embodiments, this maximum load may be greater than or less than this value), the positive pre-load permits the chain tension to be set to a lesser load. This may reduce inter-link chain wear and sprocket wear and, ultimately, increase the life of the chain 514. In addition, the tolerance "stack-up" of the spring washers 674 provides a wide range of configurations and pre-load characteristics for the reaction arm 570. In one example, a pre-load in the range of 200 to 400 lbs. may provide improved results for even very high material loads.

In one embodiment, the pre-load acts on the reaction arm 570 in a "positive" direction (i.e., substantially parallel to the direction of the force exerted on the reaction arm 570 by the flight members 550). The positive base load may facilitate accurate measurement in strain gauge sensors, enhancing accuracy of the system. In addition, the positive pre-load may also reduce the occurrence of negative outputs, which can falsely trigger system alerts.

Due to the perpendicular orientation of the load sensing pin 582 with respect to the hinge pin 574, the load sensing pin 582 only senses the vertical component (e.g., the rotation of the reaction arm 570 about the hinge pin 574) of the force exerted on the reaction arm 570. This effectively isolates the load sensing pin 582 from impacts to the load pad 602 of the reaction arm 570, resulting in improved reliability and a more accurate electrical signal.

Also, in one embodiment, the load pad 602 has a length that is a significant proportion of the distance between the flight members 550. In one embodiment, the load pad 602 has a length in a range between approximately 60% and approximately 70% of the distance between the flight members 550. This significant length provides a smaller gap between the moment when one flight member 550 contacts the load pad 602 and the moment when a second flight member 550 contacts the load pad 602, reducing the oscillation of the load pad 602 (and therefore the load sensing pin 582) between a loaded position and an unloaded position. This aids the load sensing pin 582 in generating a smooth, level signal.

Spurious loading arising from the impact of the flight members 550 with the load pad 602 is absorbed by the main support hinge pin 574, which is positioned at a right angle to both the direction of travel 554 of the chain 514 and the flight members 550. In addition, the load sensing pin 582 is not directly in contact with the wear strip 562, reducing the impact loading and insulating the load sensing pin 582 from heat caused by the friction contact of the flight members 550 sliding against the underside of the wear strip 562.

In an alternative independent embodiment, the conveyor 522 may include a plurality of load sensor assemblies 510. For example, the conveyor 522 may include a sensor assembly 510 mounted on each side of the chain 514, with each sensor 510 measuring the tension in the associated chain 514 independently and permitting the operator to detect breakage in either chain 514. Because the chains 514 are connected to one another by the flight members 550, some amount of the tension load in the chains 514 will be shared in the event that a chain 514 breaks.

While the described location of the sensor assembly 510 is beneficial because the sensor assembly 510 is subjected to less direct impact loads, in an alternative embodiment, the sensor assemblies 510 may be spaced along the length of and on either side of the conveyor 522.

Thus, the invention may generally provide, among other things, a chain tension sensor.

What is claimed is:

1. A spring assembly for a chain tension sensor assembly in an endless conveyor, the conveyor including a frame, at least one chain, and a plurality of flights coupled to the chain, the sensor assembly including a moveable arm and a sensor, the spring assembly comprising:
   a pin having a first end and a second end and passing through the arm;
   a nut positioned on the first end of the pin for securing the arm relative to the pin, the arm being on the pin between the nut and the second end; and
   a spring element positioned around the pin for applying a pre-load force on the arm, the spring element being adjustable to change the preload force.

2. The spring assembly of claim 1, wherein the spring element is adjusted by tightening the nut.

3. The spring assembly of claim 1, further comprising a retaining washer to control compression of the spring element.

4. The spring assembly of claim 3, wherein the pin includes a shoulder configured to engage the retaining washer when the spring element is tightened a predetermined amount, thereby preventing over-compression of the spring element.

5. A spring assembly for a chain tension sensor assembly in an endless conveyor, the conveyor including a frame, at least one chain, and a plurality of flights coupled to the chain, the sensor assembly including a moveable arm and a sensor, the spring assembly comprising:
   a pin passing through the arm;
   a nut for securing the arm relative to the pin; and
   a spring element for applying a pre-load force on the arm, the spring element being adjustable to change the pre-load force and including at least one spring washer having a frustoconical shape, compression of the spring washer inducing a spring force.

6. The spring assembly of claim 5, wherein the spring element includes a plurality of spring washers, the spring element being adjusted by changing the arrangement of the spring washers relative to one another.

7. A chain tensor sensor for a chain conveyor, the conveyor including a frame and a chain having a plurality of flights, the tension sensor comprising:
   a reaction arm pivotably coupled to the frame, flights contacting the reaction arm exerting a force on the reaction arm in a first direction;
   a load sensing pin coupled to the reaction arm and operable to sense the force exerted on the reaction arm; and
   a spring assembly coupled between the frame and the reaction arm to bias the reaction arm away from the frame.

8. The chain tension sensor of claim 7, wherein the spring assembly exerts a pre-load force on the load sensing pin.

9. The chain tension sensor of claim 7, wherein the chain flights travel along a chain axis, and wherein the reaction arm pivots about an arm axis substantially transverse to the chain axis.

10. The chain tension sensor of claim 9, wherein the spring assembly exerts a spring force on the reaction arm in a direction substantially perpendicular to both the chain axis and the arm axis.

11. The chain tension sensor of claim 7, wherein the spring assembly exerts a spring force on the reaction arm in a direction parallel to the first direction.

12. A conveyor assembly comprising:
   a frame supporting at least one sprocket;
   a chain driven by the sprocket and including a plurality of flights;
   a reaction arm pivotably coupled to the frame and positioned to contact the flights, the flights exerting a force on the arm in a first direction;
   a load sensor for measuring the force exerted by the flights; and
   a spring assembly coupled between the frame and the reaction arm to bias the reaction arm away from the frame.

13. The conveyor assembly of claim 12, wherein the spring assembly includes a pin passing through the arm, a nut for securing the arm relative to the pin, and a spring element for applying a pre-load force on the arm.

14. The conveyor assembly of claim 13, wherein the spring element is adjustable to change the preload force.

15. The conveyor assembly of claim 14, wherein the spring element is adjusted by tightening the nut.

16. The conveyor assembly of claim 13, wherein the nut is positioned on the pin.

17. The conveyor assembly of claim 13, wherein the spring element includes at least one spring washer having a frustoconical shape, compression of the spring washer inducing a spring force.

18. The conveyor assembly of claim 17, wherein the spring element includes a plurality of spring washers, the spring element being adjusted by changing the arrangement of the spring washers relative to one another.

19. The conveyor assembly of claim 13, further comprising a retaining washer to control compression of the spring element.

20. The conveyor assembly of claim 19, wherein the pin includes a shoulder configured to engage the retaining washer when the spring element is tightened a predetermined amount, thereby preventing over-compression of the spring element.

* * * * *